Aug. 20, 1935.  G. TABOZZI  2,011,781

FLEXIBLE PIPE FOR OIL, ESSENCE AND THE LIKE, ESPECIALLY FOR AERIAL MACHINES

Filed Oct. 25, 1933

Inventor:

Patented Aug. 20, 1935

2,011,781

UNITED STATES PATENT OFFICE 2,011,781

FLEXIBLE PIPE FOR OIL, ESSENCE, AND THE LIKE, ESPECIALLY FOR AERIAL MACHINES

Giacinto Tabozzi, Milan, Italy

Application October 25, 1933, Serial No. 695,218
In Italy August 24, 1933

1 Claim. (Cl. 137—90)

The present invention refers to an important improvement in the manufacture of pipes for essence, oil and in general for hydrocarbons, which pipes must be capable of resisting high temperatures, especially in their employment for aeroplane motors, and for aerial machines in general.

The invention which allows of avoiding a complication in the manufacture of pipes, eliminates also the inconvenience which is present with cotton cloth, that is to say the unravelling which causes obstruction and fluff in certain important parts of the motor (valves, carburettor etc.) further the invention provides a convenient combination of several layers of materials each possessing one or more properties of resistance to the solvent action of hydrocarbons either at low or high temperature, a combination which represents however the maximum of simplicity, the minimum of weight, the highest efficiency, an important simplicity of construction and a very reduced net cost in comparison with the known flexible pipes which justifies the granting of a patent.

The flexible pipe according to the invention is composed of the following elements (starting from the interior towards the exterior).

I. Spiral metallic wire of light alloy, not attackable by the fluids normally conveyed by a flexible pipe on aeroplanes and the like made of a light alloy named "Anticorrodal" or the like.

II. A waxed impermeable sheet resistant to castor oil at a temperature of 10° C.

III. Several windings, preferably six windings, of material with cellulose base, very impermeable (weight 60° gr. per square metre) commercially known as Cellodex which is an incombustible and transparent material, derived from cellulose chemically treated in order to impart impermeability.

IV. Several windings (preferably three windings) of non-inflammable material resistant to high temperatures known commercially as Cellofort which consists of a lac with adhesive properties (weight 60 gr. per metre).

V. A rubber hose of a thickness of about 8/10 mm. treated in a special manner, resistant to essence and to hydrocarbons in general, made of rubber known commercially as G. P. R. A.

VI. Again several windings of "Cellofort" (preferably three windings) forming a non-inflammable layer in place of the ordinary flax cloth, one of the windings of "Cellofort" having the function of replacing the ordinary cotton cloths.

VII. A winding of Dermotex which consists of a textile fabric of very fine flex treated with a lac with adhesive properties, of about 1/10 mm. thickness.

VIII. A spiral of steel wire of high resistance (oxide of zinc) non-oxidizable which is wound corresponding to the intervals of the internal metallic spiral. The pipe thus produced resists pressures of 18–25 atmospheres and possesses all the well known properties which are required for the satisfaction of the said flexible pipes especially for use in aviation. The flexibility is at a maximum and the durability is greater than that of the normal pipes. Unravelling is avoided and also fragments which, when they get into the channels in the pipe might injure the parts of the motor.

The individual layers may be used in the definite form and need only be applied.

In the annexed drawing the object of the invention is shown by way of example in one form.

Figure 3:
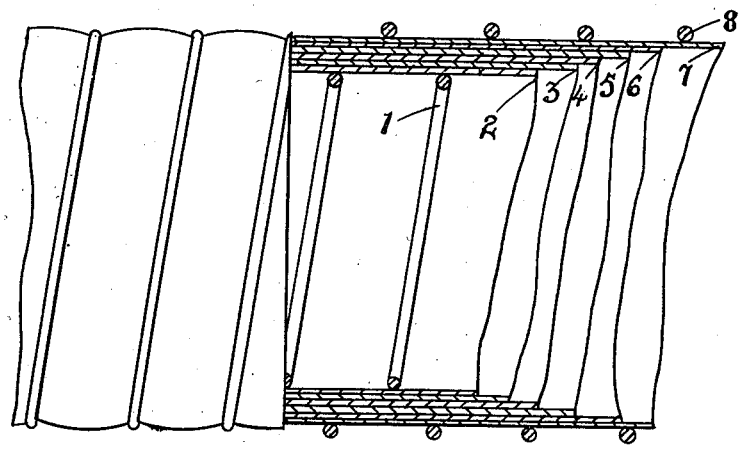
Fig. 3 is an external view on a large scale and corresponding to a longitudinal section of the flexible pipe.
Figure 1:
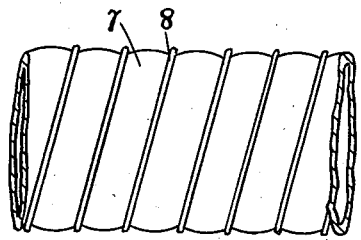
Fig. 1 shows a side view of the flexible pipe.
Figure 2:
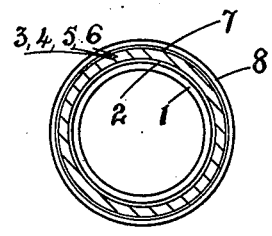
Fig. 2 is a transverse section.
Figure 4:
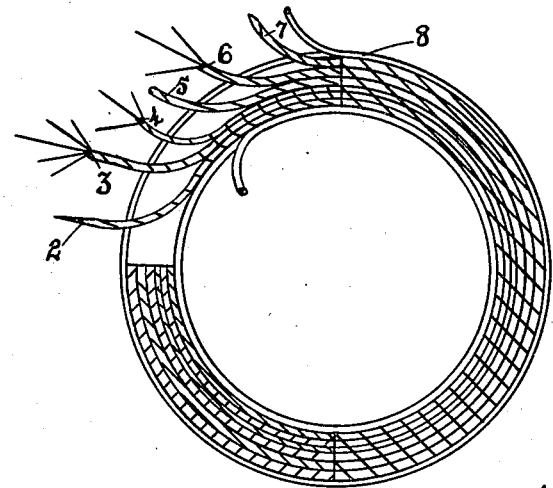
Fig. 4 is a transverse section showing the composition of the individual layers.

Referring particularly to the figures in the drawing:

1 is the spiral of metallic wire of light alloy called "Anticorrodal" or of a similar material; 2 is a layer of impermeable waxed cloth, resistant to castor oil at temperatures up to 10° C.; 3 are six windings of "Cellodex" of a special cellulose base, very impermeable (weight 60 gr. per square metre); 4 is three windings of "Cellofort" non-inflammable and resistant to all temperatures (weight 70 gr. per square metre), 5 is a hose of rubber specially treated and resistant to oil, to essence and to hydrocarbons in general (thickness 8/10 mm.), 6 are three windings of "Cellofort," non-inflammable material which has the function of replacing the ordinary flax cloth; 7 is a winding of "Dermotex" with a thickness of 1/10 mm.); 8 is a final spiral of special steel wire high resistance, non-oxidizable (oxide of zinc).

The invention consists in conveniently arranging all these different materials in the most suitable thickness with a convenient number of windings, each of these windings possessing a proper function of resistance.

The use of the windings of non-inflammable "Cellofort" also represents a big step forward in the construction of pipes and further, that it avoids the use of cloth with the consequent unravelling of which the fragments may cause fluff in the motor.

The pipes according to the invention are able to resist pressures from 11 to 25 atmospheres.

The invention having been described and illustrated solely by way of example and not limitatively, numerous modifications can be applied to the details thereof, to the order in which the layers are arranged, and to the number of windings, to the thickness of the individual layers without deviating from the spirit.

I claim:

A flexible pipe comprising a helical wire, a cloth waxed with a substance which is impermeable to castor oil laid over said helical wire, a plurality of concentric layers of a substance known as Cellodex (a product derived from cellulose chemically treated) arranged over said waxed cloth, a plurality of layers of a substance known as Cellofort (consisting of a lac with adhesive properties) over said Cellodex, a rubber hose of substantial thickness covering said Cellodex, a plurality of windings of Cellofort over said rubber hose forming a non-inflammable coating, a covering known as Dermotex consisting of a textile fabric of very fine flex treated with a lac with adhesive properties wound around said Cellofort layers and a metal wire helically wound over said Dermotex.

GIACINTO TABOZZI.